United States Patent
Frances

(10) Patent No.: US 7,624,879 B2
(45) Date of Patent: Dec. 1, 2009

(54) MICROPULP FOR FILTERS

(75) Inventor: Arnold Frances, Glen Allen, VA (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 114 days.

(21) Appl. No.: 11/953,375

(22) Filed: Dec. 10, 2007

(65) Prior Publication Data

US 2009/0145842 A1    Jun. 11, 2009

(51) Int. Cl.
*B01D 39/00*    (2006.01)

(52) U.S. Cl. .................. 210/505; 210/503; 428/474.4; 428/476.9; 428/480; 428/482; 428/483

(58) Field of Classification Search ............... 210/503, 210/505; 428/474.4, 474.7, 474.9, 475.5, 428/476.1, 476.3, 476.5, 476.9, 480, 482, 428/483
See application file for complete search history.

(56) References Cited

U.S. PATENT DOCUMENTS

| | | |
|---|---|---|
| 2,999,788 A | 9/1961 | Morgan |
| 3,018,091 A | 1/1962 | Duggins |
| 3,767,758 A | 10/1973 | Blades |
| 3,869,429 A | 3/1975 | Blades |
| 3,869,430 A | 3/1975 | Blades |
| 5,026,456 A | 6/1991 | Hesler et al. |
| 5,028,372 A | 7/1991 | Brierre et al. |
| 5,209,877 A | 5/1993 | Frances et al. |
| 5,474,842 A | 12/1995 | Hoiness |
| 5,702,616 A | 12/1997 | Degen et al. |
| 2003/0011994 A1 | 1/2003 | Loebach |
| 2003/0114641 A1 | 6/2003 | Kelly et al. |
| 2004/0019119 A1 | 1/2004 | Gamble et al. |
| 2005/0026526 A1 | 2/2005 | Vardegan et al. |

FOREIGN PATENT DOCUMENTS

EP    0109169    10/1983

*Primary Examiner*—John Kim

(57) ABSTRACT

A filter made from a blend of a polymeric fibrous pulp having a length weighted average fiber length between 0.5 and 1.1 mm and a polymeric fibrous micropulp having a volume weighted average fiber length between 1.0-200.0 micrometers in which the ratio of average fiber length of the fibrous pulp to fibrous micropulp is greater than or equal to about 4:1.

12 Claims, No Drawings

MICROPULP FOR FILTERS

BACKGROUND OF THE INVENTION

1. Field of the Invention

This invention is directed to the use of micropulp in a filter.

2. Description of Related Art

United States Patent Application Publication 2003/0114641 published Jun. 19, 2003 relates to a process for producing micropulp in a liquid component and discloses that liquid component can be an aqueous liquid, one or more liquid polymers, one or more solvents, or a combination thereof. Micropulp has been used in various types of applications as described in United States Patent Application Publication 2003/0119948, published Jun. 26, 2003, which is directed to coating compositions made from a dispersion of micropulp in a liquid component such as an aqueous liquid, one or more liquid polymers, one or more solvents, or a combination thereof and United States Patent Application Publication 2004/0191192, published Sep. 30, 2004, which is directed to liquid nail polish compositions containing micropulp wherein the micropulp is in a nail polish resin system of a resin and a solvent.

United States Patent Application Publication 2005/0026526, published Feb. 3, 2005 is directed to filter media made from a blend of nanofibers (diameters less than 200 nm) and micro fibers. U.S. Pat. No. 5,702,616 to Degen et al is directed to filtration sheets made from aramid fibers. EP 0109169 is directed to small diameter fibers for use in filters. Nevertheless, the use of micropulp as described herein for filters has not been addressed.

DETAILED DESCRIPTION OF THE INVENTION

As used herein, micropulp is a processed organic fiber having a volume weighted average length ranging from 1 to 500 micrometers, or 5 to 300 micrometers or even 10 to 200 micrometers. Such micropulps generally have an average surface area ranging from 25 to 500 square meters per gram. The micropulp of the present invention is a fibrous organic material that includes an intermeshed combination of two or more webbed, dendritic, branched, mushroomed or fibril structures.

As used herein, the volume average length is calculated by the following equation:

$$\frac{\sum (\text{number of fibers of given length}) \times (\text{length of each fiber})^4}{\sum (\text{number of fibers of given length}) \times (\text{length of each fiber})^3}$$

As used herein, fibrous pulp is a processed organic fiber having a length weighted average length ranging from 0.5 to 2.0 mm.

Micropulp is made by contacting an organic fiber with a medium comprised of a liquid component and a solid component and then agitating the combination to size reduce and modify the organic fiber. The organic fiber used as a starting material can include pulp, short fiber, fibrids or mixtures of these forms. Through this treatment the micropulp is uniformly dispersed in the liquid component.

Pulps can be made by refining short fibers between rotating discs to cut and shear the fibers into smaller pieces. Pulp particles differ from short fibers by having a multitude of fibrils or tentacles extending from the body of each pulp particle. These fibrils or tentacles provide minute hair-like anchors for reinforcing composite materials and cause the pulp to have a very high surface area. A particularly useful starting material is aramid pulp, which is well known in the art and can be made by refining aramid fibers to fibrillate the short pieces of aramid fiber material. Such pulps have a surface area in the range of 4.2 to 15 meters$^2$/gram and a weight average length in the range of 0.6 to 2.0 millimeters (mm). Such pulps have a high volume average length, compared to the micropulp. For example, Merge 1F543 KEVLAR® aramid pulp, available from E. I. du Pont de Nemours and Company, Wilmington, Del. (DuPont) has a weighted average length of 1.05 mm. KEVLAR® is a registered trademark of DuPont. An alternate method of making aramid pulp directly from a polymerizing solution is disclosed in U.S. Pat. No. 5,028,372.

Short fiber (sometimes called floc) is made by cutting continuous filament into short lengths without significantly fibrillating the fiber. Short fiber length typically ranges from about 0.25 mm to 12 mm. Short fibers suitable for use in the present invention are the reinforcing fibers disclosed in U.S. Pat. No. 5,474,842.

Fibrids are non-granular film-like particles having an average maximum length or dimension in the range of 0.2 to 1 mm with a length-to-width aspect ratio in the range of 5:1 to 10:1. The thickness dimension is on the order of a fraction of a micrometer. Aramid fibrids are well known in the art and can be made in accordance with the processes disclosed in U.S. Pat. Nos. 5,209,877, 5,026,456, 3,018,091 and 2,999,788. The processes typically include adding a solution of organic polymer in solvent to another liquid that is a non-solvent for the polymer but is miscible with the solvent and applying vigorous agitation to cause coagulation of fibrids. The coagulated fibrids are wet milled, separated, and dried to yield clumps of fibrids having a high surface area; the clumps are then opened to yield a particulate fibrid product.

Micropulp used in embodiments of the present invention can be made from an organic fiber comprised of aliphatic polyamides, polyesters, polyacrylonitriles, polyvinyl alcohols, polyolefins, polyvinyl chlorides, polyvinylidene chlorides, polyurethanes, polyfluorocarbons, phenolics, polybenzimidazoles, polyphenylenetriazoles, polyphenylene sulfides, polyoxadiazoles, polyimides, aromatic polyamides, or a mixture thereof. Especially useful polymers are made from aromatic polyamides, polybenzoxadiazole, polybenzimidazole, or a mixture thereof. Other organic fibers suitable for use in the present invention include natural fibers, such as cellulose, cotton, silk, and/or wool fibers.

Some commercially available fibers useful as a starting material for micropulp include ZYLON® PBO-AS (poly(p-phenylene-2,6-benzobisoxazole)) fiber, ZYLON® PBO-HM (poly(p-phenylene-2,6-benzobisoxazole)) fiber, all supplied by Toyobo, Japan; DYNEEMA® SK60 and SK71 ultra high strength polyethylene fibers available from DSM, Geleen, Holland, Celanese VECTRAN® HS pulp, EFT 1063-178, supplied by Engineering Fibers Technology, Shelton, Conn; CFF Fibrillated Acrylic Fiber supplied by Sterling Fibers, Inc., Pace, Fla; and Tiara Aramid KY-400S Pulp supplied by Daicel Chemical Industries, Ltd., 1 Teppo-Cho, Sakai City Japan.

The preferred organic fibers comprise fibers made from the aromatic polyamide polymers poly (p-phenylene terephthalamide) and/or poly (m-phenylene isophthalamide). Such fibers are also known as aramid fibers. As used herein, "aramid" is meant a polyamide wherein at least 85% of the amide (—CONH—) linkages are attached directly to two aromatic rings. Additives can be used with the aramid. In fact, it has been found that up to as much as 10 percent, by weight, of other polymeric material can be blended with the aramid or that copolymers can be used having as much as 10 percent of other diamine substituted for the diamine of the aramid or as much as 10 percent of other diacid chloride substituted for the diacid chloride of the aramid. Such organic fibers are disclosed in U.S. Pat. Nos. 3,869,430; 3,869,429; 3,767,756; and 2,999,788. Preferred aromatic polyamide organic fibers are known under the trademark KEVLAR® fibers, KEVLAR® aramid pulp, Merge 1F543; 1.5 mm KEVLAR® aramid floc Merge 1F561; and NOMEX® aramid fibrids Merge F25W. All of these are available from DuPont.

Micropulp having a high degree of fibrillation provides a finer filter than a typically cylindrical fiber of approximately the same dimensions. A more efficient filter can be made from micropulp, whether it is aramid, acrylic or any other fiber that will fibrillate well. The effective fiber diameter of micropulp is much smaller than standard pulp and because it is more fibrillated has a much higher surface area. Embodiments of this invention can include wet laid filter papers made of blends of micropulp and standard pulp or micropulp added to any other wet laid filter paper. Being finer than standard pulps, the micropulp would result in papers with finer pores thereby trapping finer particles. Likewise, the micropulp could be added to any filter substrate during the wet laid process to reduce its pore size. The micropulp fibers are produced in water as a slurry. This slurry is then passed through a membrane using a vacuum to drain the water leaving behind a filter paper. This process can be run commercially using large batch tanks and membranes or continuously on a paper making machine with a screen fine enough to catch the fibers. The filters can be made of micropulp, micropulp blended with fibers and/or standard pulps, or the micropulp can be added to any slurry used to produce a filter to create one even finer.

In one embodiment, a filter can be made from a blend of a polymeric fibrous pulp having a filament diameter that is at least 6 micrometers and a polymeric fibrous micropulp having a filament diameter smaller than that of the fibrous pulp in which the ratio of average fiber length of the fibrous pulp to fibrous micropulp is greater than or equal to 4:1. The filament diameters of the fibrous pulp can be in the range of 6 to 22 micrometers or in the range of 9 to 18 micrometers or even in the in the range of 11 to 16 micrometers. The ratio of average fiber length of the fibrous pulp to fibrous micropulp can be in the range of 4:1 to 120:1 or in the range of 6:1 to 22:1 or even in the range of 8:1 to 18:1.

The polymeric fibrous pulp may comprise nylon, aromatic polyamide, polyolefin (such as, polyethylene and polypropylene), polyareneazole, polyester, polyacrylonitrile or polyvinyl alcohol. Fiberglass, carbon, ceramic can comprise additions to the polymeric fibrous pulp. In one embodiment, the fibrous pulp comprises greater than about 90 weight percent aramid.

The polymeric fibrous micropulp may comprise nylon, aromatic polyamide, polyolefin (such as, polyethylene and polypropylene), polyareneazole, polyester, polyacrylonitrile, or polyvinyl alcohol. Fiberglass, carbon, ceramic can comprise additions to the polymeric fibrous micropulp. In one embodiment the fibrous micropulp comprises greater than about 90 weight percent aramid.

In one embodiment a filter may comprise 3 to 50% fibrous micropulp or 5 to 25% fibrous micropulp or even 7 to 15% fibrous micropulp based on the total weight of fibrous pulp plus fibrous micropulp. Additionally, the filter may comprise a fibrous floc. The filter may further comprise a scrim of any woven or nonwoven fabric.

It is preferred that the filter of the subject invention has an average pore size of between about 0.4 and about 1.6 micrometers.

EXAMPLES

A slurry of 2% of KEVLAR® Merge 1F543 aramid in water was prepared in an agitated tank. Merge 1F543 is commercially available from DuPont and has nominal properties of a Canadian Standard Freeness of 140 ml, a weighted average fiber length of 1.05 mm and 6.5% moisture. A portion of the slurry was removed and stored for later use as a control for comparative purposes and for making blends with micropulp.

The remaining portion of the slurry was recirculated through a media mill and one liter samples were periodically collected to obtain batches of micropulp having mean fiber lengths of 15.6, 26.5, 58.5, 93.6 and 149.0 μm with the batches designated F5, F4, F3, F2, F1, respectively. Blends of 90% standard pulp and 10% micropulp were prepared in a plastic container with a closed top and agitated by hand, with a blend made for each of the aforementioned fiber length micropulp batches.

The paper examples were made substantially as follows. A 1⅞ in (4.8 cm) microporous polyethylene film with a pore size of 0.1 micrometer was placed in a 250 ml sintered glass funnel and the funnel was clamped down and placed in a vacuum flask. A vacuum of about 750 mm of Hg was applied to the flask. Whether making a control example or a working example, 20 g of the slurry was poured into a container, diluted with about 80 g of water and shaken by hand. Larger paper samples could be made using larger quantities as long as the 20/80 ratio is maintained. The 100 g of slurry was poured into a sintered funnel with the polyethylene film in place and 750 mm of Hg of vacuum pulled until all the water was removed and the paper was formed. The vacuum was then released and the paper was removed. The paper was dried in an oven at 250 deg F. (121 deg C.) until no further weight loss could be observed. The diameter of the paper was 38 mm.

Testing the Filter Efficiency of the Paper

1. The weight of dry paper was measured and recorded.
2. The paper was placed in a Buchner funnel and vacuum (750 mm Hg) applied. An inspection was made to ensure that enough vacuum was applied so that the paper was sucked down and sealed.
3. A particulate filler slurry was prepared in a container by hand agitating 2 g of filler and 20 g of water. The filler materials used were:

Rhodax 0.05 CR available from Universal Photonics, Hicksville, N.Y.

Kaolin Clay available from Huber Engineered Materials, West Point, Ga.

Fumed Alumina available from Evonik Industries, Theodore, Ala.

Lo-Vel® Silica Grade 27 (2 micrometer) available from PPG Industries, Pittsburgh, Pa.

Ti-Pure® titanium dioxide Grade R706 (0.36 micrometers) available from DuPont

Ti-Pure® titanium dioxide Grade R700 (0.34 micrometers) available from DuPont

Biltplates 156 talc is available from RT Vanderbilt Company, Norwalk, Conn.

4. With the vacuum already applied on the paper in the funnel, the filler slurry was poured into the funnel.
5. When no more liquid was observed coming through the funnel, the vacuum was released and the paper with the trapped filler was removed and placed in an oven at 250 deg F.(121 deg C.) until dry. The paper was then weighed.
6. The weight of the retained filler was equal to the dried weight minus the original weight of paper and the filler retention was the percent of the total dry filler that was trapped in the paper. Three to nine tests were conducted for each blend/fiber size example and the results were averaged. The results are shown in Table 1.

Fiber Length Determination

The fiber length of the fibrous pulp was measured using a Fiber Expert machine supplied by Metso Corporation, Helsinki, Finland. The fiber length of the fibrous micropulp was measured with a Beckman Coulter LS200 laser diffraction unit available from Beckman Coulter inc., Miami, Fla.

TABLE 1

| Example i.d. | Blend | Mean Micropulp Fiber Length (μm) | Dry Filter Wt. (grams)* | Filler Material | Mean Filler Size (μm) | % Filler Retained (***) |
|---|---|---|---|---|---|---|
| Comp 1 | Standard pulp | 1050** | 0.34 | RHODAX 0.05 CR | 7.9 | 90 |
| 1 | 10% F-5 | 15.6 | 0.27 | RHODAX 0.05 CR | 7.9 | 93 |
| 2 | 10% F-4 | 26.5 | 0.28 | RHODAX 0.05 CR | 7.9 | 94 |
| 3 | 10% F-3 | 58.5 | 0.26 | RHODAX 0.05 CR | 7.9 | 94 |
| 4 | 10% F-2 | 93.6 | 0.30 | RHODAX 0.05 CR | 7.9 | 92 |
| 5 | 10% F-1 | 149.0 | 0.30 | RHODAX 0.05 CR | 7.9 | 95 |
| Comp 2 | Standard pulp | 1050** | 0.34 | KAOLIN CLAY | 7.8 | 99 |
| 6 | 10% F-1 | 149.0 | 0.30 | KAOLIN CLAY | 7.8 | 97 |
| Comp 3 | Standard pulp | 1050** | 0.34 | FUMED ALUMINA | 8.2 | 98 |
| 7 | 10% F-1 | 149.0 | 0.29 | FUMED ALUMINA | 8.2 | 95 |
| Comp 4 | Standard pulp | 1050** | 0.34 | LO-VEL 27 SILICA | 6.8 | 94 |
| 8 | 10% F-1 | 149.0 | 0.30 | LO-VEL 27 SILICA | 6.8 | 96 |
| Comp 5 | Standard pulp | 1050** | 0.26 | TI-PURE R706 | 1.6 | 80 |
| 9 | 10% F-1 | 149.0 | 0.24 | TI-PURE R706 | 1.6 | 95 |
| Comp 6 | Standard pulp | 1050** | 0.34 | BILT-PLATES 156 | 20.4 | 97 |
| 10 | 10% F-1 | 149.0 | 0.32 | BILT-PLATES 156 | 20.4 | 99 |
| Comp 7 | Standard pulp | 1050** | 0.34 | TI-PURE R700 | 1.3 | 22 |
| 11 | 10% F-1 | 149.0 | 0.25 | TI-PURE R700 | 1.3 | 46 |
|  |  |  | 0.26 |  | 1.3 | 53 |
|  |  |  | 0.43 |  | 1.3 | 95 |

*Dry weight of a 38 mm diameter paper.
**Standard pulp control fiber was too long to measure by laser diffraction. This fiber was 1.05 mm (1050 micrometers) via optical measurements.
*** % retention numbers are the average of between 3 and 9 determinations.

As can be determined from the tables, the filters made from the inventive materials performed as well or significantly better than the filters made from the standard pulps in the comparative examples. This is more pronounced when, as is shown in Table 2, the material being filtered is below 6 micrometers.

TABLE 2

| Example i.d. | Blend | Dry Filter Wt. (grams)* | Filler Material | Mean Filler Size (μm) | % Filler Retained (***) | % Filler Lost |
|---|---|---|---|---|---|---|
| Comp 5 | Standard pulp | 0.26 | TI-PURE R706 | 1.6 | 80 | 20 |
| Ex. 9 | 10%-F1 | 0.24 | TI-PURE R706 | 1.6 | 95 | 5 |
| Comp 7 | Standard pulp | 0.34 | TI-PUR R700 | 1.3 | 22 | 78 |
| Ex. 11 |  | 0.25 | TI-PURE R700 | 1.3 | 46 | 54 |
|  |  | 0.26 |  | 1.3 | 53 | 47 |
|  |  | 0.43 |  | 1.3 | 95 | 5 |

Enhanced filtering efficiency can also be obtained by increasing the filter paper volume as shown in Table 3. All papers were 38 mm in diameter. The filler material was TI-PURE R700 prepared as described above.

TABLE 3

| Fibrous Material | Average Dry Weight (gm) | Micropulp Fiber Length (μm) | Retention % |
|---|---|---|---|
| Comp 7(Control) | 0.34 | None present | 22 |
| 10% F-1** | 0.26 | 149 | 53 |
| 10% F-1** | 0.43 | 149 | 95 |
| 10% F-2 | 0.59 | 94 | 91 |
| 10% F-3 | 0.59 | 59 | 87 |

What is claimed is:

1. A filter, comprising a blend of a polymeric fibrous pulp having a length weighted average fiber length between 0.5 and 1.1 mm and a polymeric fibrous micropulp having a volume weighted average fiber length between 1.0-200.0 micrometers in which the ratio of average fiber length of the fibrous pulp to fibrous micropulp is greater than or equal to 4:1.

2. The filter of claim 1, wherein the polymeric fibrous pulp comprises at least one material selected from the list consisting of nylon, aromatic polyamide, polyolefin, polyareneazole, polyester, polyacrylonitrile and polyvinyl alcohol.

3. The filter of claim 2, wherein the fibrous pulp comprises greater than about 90 weight percent aramid.

4. The filter of claim 1, wherein the polymeric fibrous micropulp comprises at least one material selected from the list consisting of nylon, aromatic polyamide, polyolefin, polyareneazole, polyester, polyacrylonitrile and polyvinyl alcohol.

5. The filter of claim 4, wherein the fibrous micropulp comprises greater than about 90 weight percent aramid.

6. The filter of claim 1, in which the volume weighted average fiber length of the fibrous micropulp is in the range of 5.0-200.0 micrometers.

7. The filter of claim 1, in which the ratio of average fiber length of the fibrous pulp to fibrous micropulp is in the range of 4:1 to 120:1.

8. The filter of claim 1, in which the ratio of average fiber length of the fibrous pulp to fibrous micropulp is in the range of 8:1 to 18:1.

9. The filter of claim 1, in which the percentage weight of fibrous micropulp is in the range of 3 to 50% based on the total weight of fibrous pulp plus fibrous micropulp.

10. The filter of claim 1, in which the percentage weight of fibrous micropulp is in the range of 7 to 15% based on the total weight of fibrous pulp plus fibrous micropulp.

11. The filter of claim 1, wherein the filter additionally comprises a fibrous floc.

12. The filter of claim 1, wherein the filter additionally comprises a scrim.

* * * * *